July 2, 1963  R. DUBLIRER ET AL  3,096,428
THERAPEUTIC WARMING PAD FOR ANIMALS
Filed April 3, 1961  4 Sheets-Sheet 1
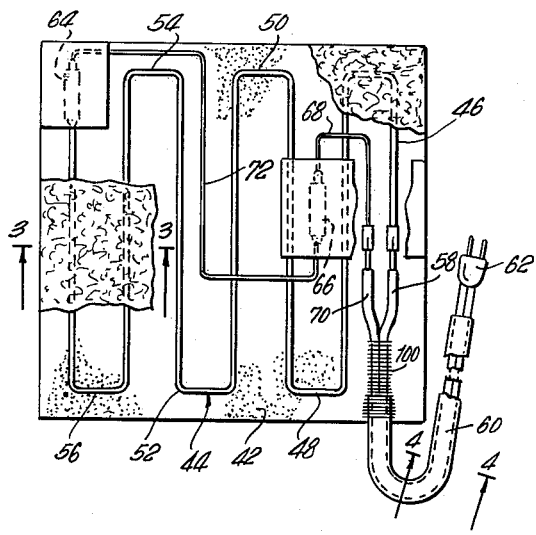
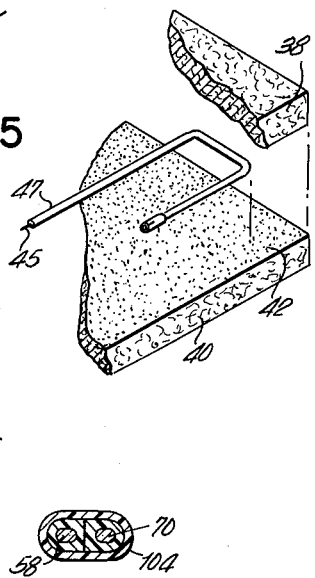
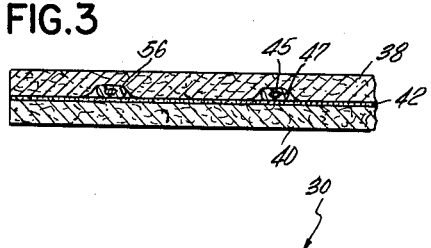
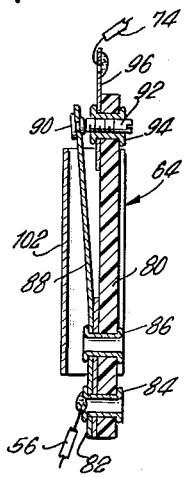
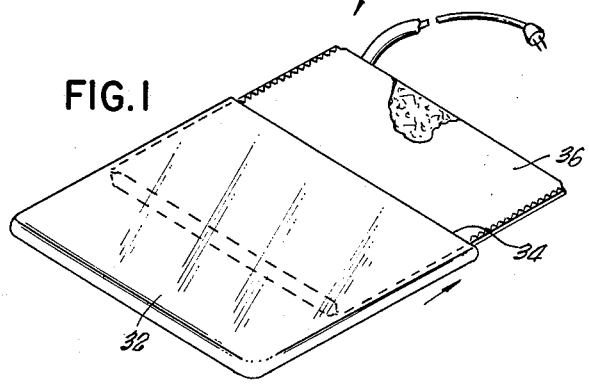
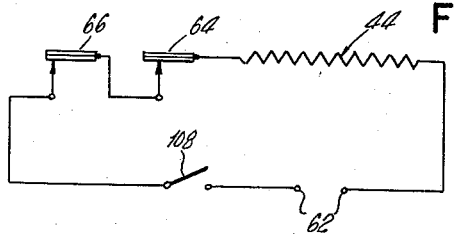
INVENTORS
LAWRENCE KATZMAN
SARA M. BARBARESI
BY ROBERT DUBLIRER
Amster & Levy
ATTORNEYS July 2, 1963

R. DUBLIRER ET AL 3,096,428

THERAPEUTIC WARMING PAD FOR ANIMALS

Filed April 3, 1961

INVENTORS
LAWRENCE KATZMAN
SARA M. BARBARESI
BY ROBERT DUBLIRER

ATTORNEYS

July 2, 1963  R. DUBLIRER ET AL  3,096,428
THERAPEUTIC WARMING PAD FOR ANIMALS
Filed April 3, 1961  4 Sheets-Sheet 3
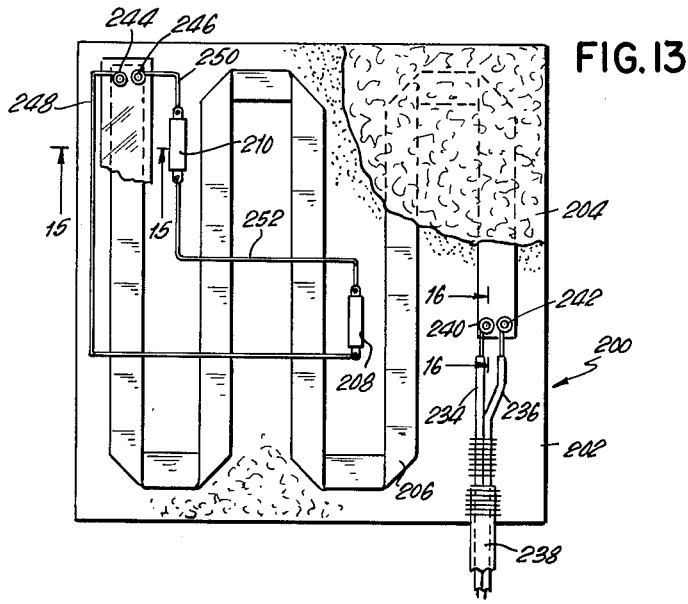
FIG. 13
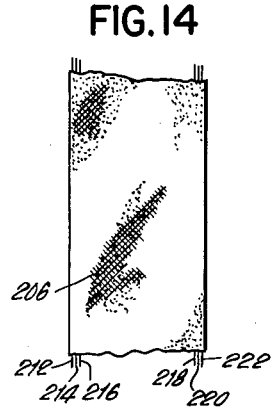
FIG. 14
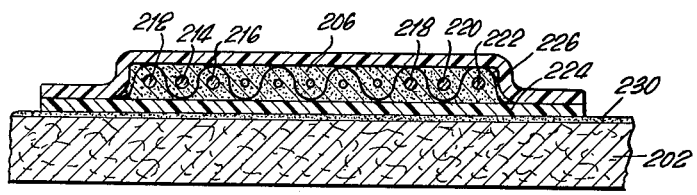
FIG. 15
FIG. 16
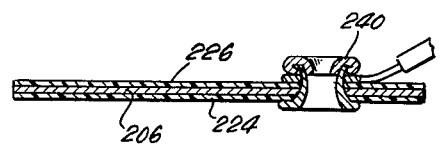
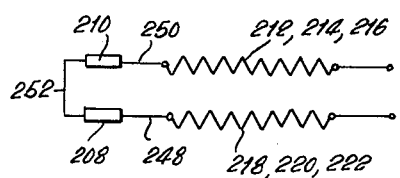
FIG. 17
INVENTORS
LAWRENCE KATZMAN
SARA M. BARBARESI
BY ROBERT DUBLIRER
Amster & Levy
ATTORNEYS

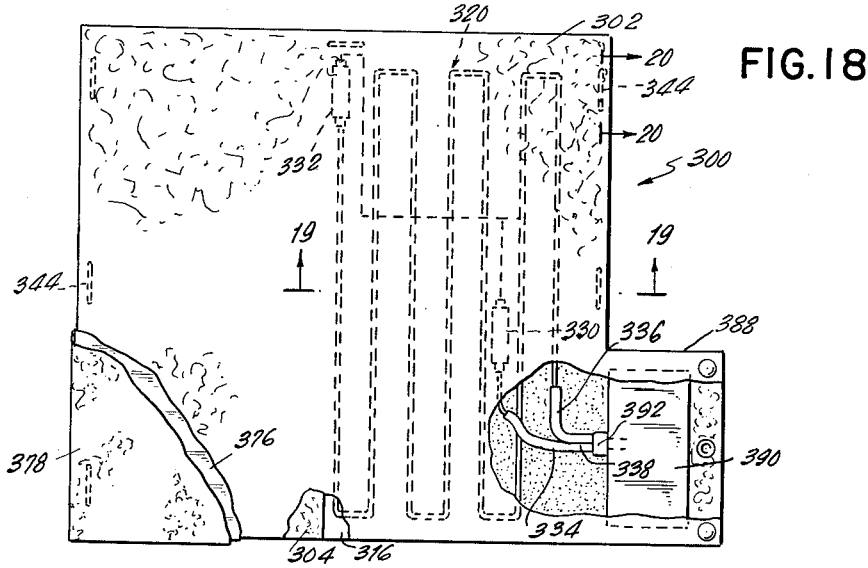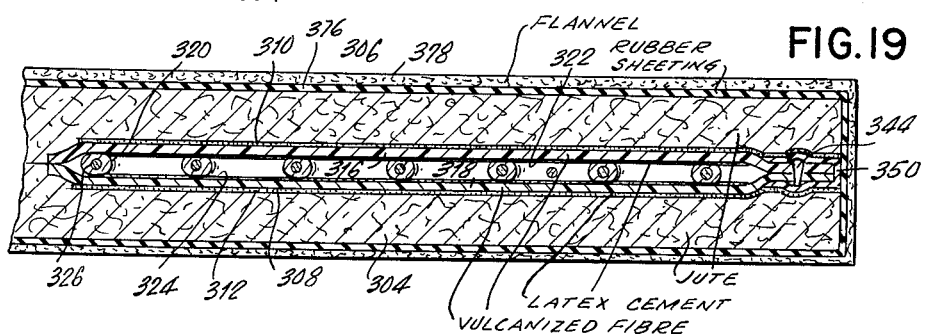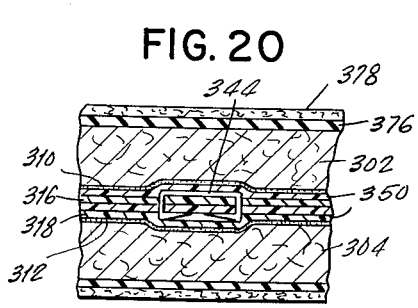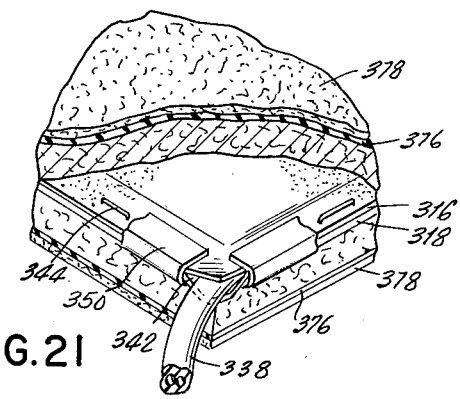

United States Patent Office 3,096,428
Patented July 2, 1963

3,096,428
THERAPEUTIC WARMING PAD FOR ANIMALS
Robert Dublirer, 10 Downing St., Sara M. Barbaresi, 308 E. 49th St., and Lawrence Katzman, 11 Riverside Drive, all of New York, N.Y.
Filed Apr. 3, 1961, Ser. No. 100,174
3 Claims. (Cl. 219—46)

This invention relates to appliances for use in animal husbandry and more particularly to an animal warming pad.

The therapeutic value of controlled amount of heat for use in treating various disorders of small animals, especially cats, dogs, parakeets and other pets is well known to the veterinary profession. Application of heat is essential for satisfactory and speedy recovery from shock resulting from injuries such as being run over by an automobile, recovery from anesthesia especially if prolonged due to major surgery, and other disorders too numerous to mention.

Aging pets generally need or desire warmth to overcome pain and stiffness due to rheumatism, arthritis, joint disorders, and the like. Further, many pets will forsake their beds for a cosy position near a gas or electric heater, fireplace, or radiator which often leads to accidental burns or other serious injuries to these pets while the pets are underfoot and not using their bedding.

Accordingly it is an important object of the present invention to provide a warming pillow for animals which may be disposed on the bed of a pet for luring the animal to repose in the space provided for the pet, the warming pillow being especially adapted for use in animal hospitals.

An additional object of the invention is to provide an animal warming pillow that provides unusual comfort and therapeutic treatment for pet animals by employing new types of materials not heretofore used in heating pads which also serves to protect the animals and the heating pad from damage.

In the past, conventional heating pads have been used for animals. These heating pads are universally unacceptable for use with animals since even if a switch having a "low" heat setting were to be provided for the conventional heating pad, too much heat would still be provided. Further, conventional heating pads are generally constructed out of materials which are susceptible to prompt destruction by the teeth and claws of animals. In addition, the various body fluids of animals will quickly render conventional heating pads quite noxious or useless. It is therefore, a further object of the present invention to provide a warming pillow for animals that will provide a controlled amount of heat at a much lower level than conventional heating pads while being substantially impervious to destruction by household pets.

Breeders of dogs and cats often employ heating pads of conventional construction as an aid to keeping new-born litters alive and healthy. However, because of the excess heat which is put out by conventional heating pads, the heating pads generally must be wrapped in numerous layers of towelling or the like. Because of the bulk of the wrapped heating pad, if a new-born puppy slips off, it is generally impossible for the puppy to climb back on the heating pad. Further, when such heating pads are employed in large litters of various breeds of dogs of substantial size such as collies, setters, German shepherds, boxers, Great Danes, etc., the usual wrapped heating pad is far too small. When the bitch needs to nurse the puppies, the heating pad, because of its wrapped bulk, must be removed. It is therefore, a further object of the present invention to provide means for facilitating the whelping and care of new-born puppies and the like.

This invention includes the concept of providing a whelping pad or pillow of an enlarged size so as to substantially fill a whelping box, which is substantially impervious to body juices, which is bite and tear resistant yet which is sufficiently soft and flexible to afford utmost comfort to dam and litter, and which has provision for supplying controlled heat to one half thereof, the other half of the whelping pad not being heated and receiving the dam for protection of the dam and her milk. This is usually highly desirable since conventional heating pads render a dam uncomfortable since the dam usually runs an elevated temperature after whelping.

It has been found that many borderline puppies have been saved and experimental tests have proven that the usual mortality rate of about 35% of purebred puppies is reduced to about 15% when this whelping pad comprising the present invention is employed.

Still further objects and features of this invention reside in the provision of a therapeutic warming pillow for animals that is sturdy and durable, soft and comfortable to pets, provided with thermostatic control of the heat emanating therefrom, and which may be produced by mass production methods at a low enough cost to permit wide distribution and sale.

These, together with the various ancillary objects and features of the invention which will become apparent as the following description proceeds, are attained by this therapeutic animal warming pillow, preferred embodiments of which are illustrated in the accompanying drawing, by way of example only, wherein FIG. 1 is a perspective view of an embodiment of the invention;

FIG. 2 is a top plan view of the warming pillow, with portions being broken away to show the construction of other parts with greater clarity;

FIG. 3 is a sectional detail view of the invention taken along the plane of line 3—3 in FIG. 2;

FIG. 4 is a sectional view taken along the plane of line 4—4 in FIG. 2, illustrating details of construction of one form of cord assembly which can be employed;

FIG. 5 is a partial exploded perspective view illustrating a step in the method of constructing the warming pillow;

FIG. 6 is a wiring diagram of an embodiment of the invention;

FIG. 7 is a sectional detail view of a thermostat of the type employed in the invention;

FIG. 13 is a plan view with parts being broken away of a further embodiment of the invention employing a ribbon conductor as a heating coil;

FIG. 14 is a partial plan view of a portion of a ribbon conductor;

FIG. 15 is a sectional view in an enlarged scale taken along the plane of line 15—15 in FIG. 13;

FIG. 16 is a sectional view taken along the plane of line 16—16 in FIG. 13 illustrating the physical connection between the cord and the ribbon conductor;

FIG. 17 is a wiring diagram of the embodiment of the invention shown in FIGS. 14 through 16;

FIG. 18 is a plan view of a preferred embodiment of the invention employing insulative fiber boards, with parts being broken away to illustrate details of construction of the invention;

FIG. 19 is an enlarged sectional view taken along the plane of line 19—19 in FIG. 18;

FIG. 20 illustrates the construction of the warming pillow along an edge thereof and is an enlarged sectional view taken along the plane of line 20—20 in FIG. 18; and, FIG. 21 is a partial perspective view of a corner of the warming pillow with parts thereof being broken away.

Figure 8:
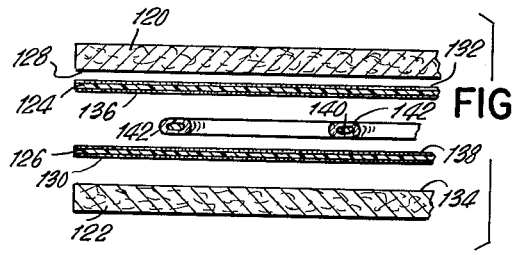
FIG. 8 is an exploded sectional detail view illustrating component elements of an embodiment of the invention employing insulative boards for sandwiching the heating conductors.

With continuing reference to the accompanying drawings wherein like reference numerals designate similar parts throughout the various views, and with initial attention to the embodiment of the invention illustrated in FIGS. 1 through 7, reference numeral 30 is used to generally designate the animal warming pillow or pad of this embodiment of the invention.

The warming pillow 30 includes an outer slipover cover 32 formed of flannel which is attractive in appearance and readily washable. It has been found that the use of this material for the outer cover is highly advantageous since it is comfortable for an animal to lie upon, provides traction for the feet of small animals, is relatively strong and durable while being inexpensive. The slipover cover 32 is open at one end 34. The pillow 30 is provided with an inner fixed cover 36 formed of a washable, fluid resistant and waterproof material such as rubber on cotton fabric which is sewn around the other portions of the pillow along three edges thereof, the other edge being at the folded line of the sheet of material from which the cover 36 is formed.

The cover 36 surrounds two relatively thick layers of jute fibers 38 and 40. These layers 38 and 40 of jute are sized on their opposing faces for toughening the layers and are cemented to each other by a suitable adhesive 42 such as latex cement which may contain a substance repellant to an animal to urge the animal to cease biting the warming pillow 30 if the animal is in the process of biting the pillow 30. The inner cover 36 completely seals the warming pillow against escape of any matter which may be noxious to a dog or like animal preventing the repellant matter from being effective until the inner cover 36 has been torn or bitten into.

The heating coil generally indicated at 44 is constructed of an electrical conductor 45 such as copper which is wrapped with asbestos 47 to form electrical and thermal insulation. The asbestos fibres are rather loose and thus bind readily with the adhesive 42 so that the heating coil 44 is firmly bonded in place. The coil 44 includes a plurality of alternating loops 46, 48, 50, 52, 54 and 56 which are serially connected to each other and to one conductor 58 of an electrical cord 60 having a plug 62 at the free end thereof.

Connected to the loop 56 of the heating coil 44 which is at one corner portion of the warming pad 30 is a thermostat 64. A second thermostat 66 is located within the confines of loop 48 and is connected by a portion 68 of the heating coil 44 to the other conductor 70 of the cord 60. A portion 72 of the heating coil 44 interconnects the thermostats 64 and 66. The thermostats 64 and 66 are of similar construction and are of the type which will attain an open circuit position in the presence of more heat than is desired. The construction of the thermostat 64 can be best understood from an inspection of FIG. 7. The thermostat 64 includes a base 80 of insulative material. A first conductive plate 82 is held to the base 80 by means of eyelets 84 and 86 which also serve to rivet one end of a bimetallic strip 88 to the plate 82. The heating coil loop 56 is connected to eyelet 84. At the other end of the strip 88 is a movable contact 90 which is adapted to normally engage an adjustable contact 92 adjustably secured in eyelet 94 which also serves to mount conductive plate 96 on base 80. The position 72 of the heating coil 44 is attached to plate 96. The bimetallic strip 88 is normally closed but when heated it will flex to disengage contact 90 from contact 92. The thermostats 64 and 66 are set so that the pillow 30 produces heat at a controlled temperature ranging between 105 degrees and 107 degrees Fahrenheit, which has been determined to be optimum for use with dogs whose normal body temperature ranges between 101.5 degrees Fahrenheit and 102.5 degrees Fahrenheit.

The cord 60 is fastened to the layer 40 of jute by means of staples or stitching as at 100 and upon pressing layer 38 on the adhesive 42 on layer 40 the heating coil 44, thermostats 64 and 66 and the end of cord 60 are suitably sandwiched in place. It is noted that a protective cover 102 is provided for each thermostat. Further a protective covering 104 may be provided for the cord 60. This covering 104 is preferably formed of polyethylene or like plastic material.

If it is desired, the cord 60 may be provided with a conventional switch 108.

The warming pillow 30 is adapted to be used in treatment of rheumatism and arthritis in dogs and other animals while providing a cosy bed for the animal to lie upon. When animals are given anesthesia during surgical procedures or are in shock following accidents, it is imperative for recovery to apply controlled heat to maintain body temperature. The warming pillow 30 has been found to be very satisfactory for such purposes.

Figure 10:
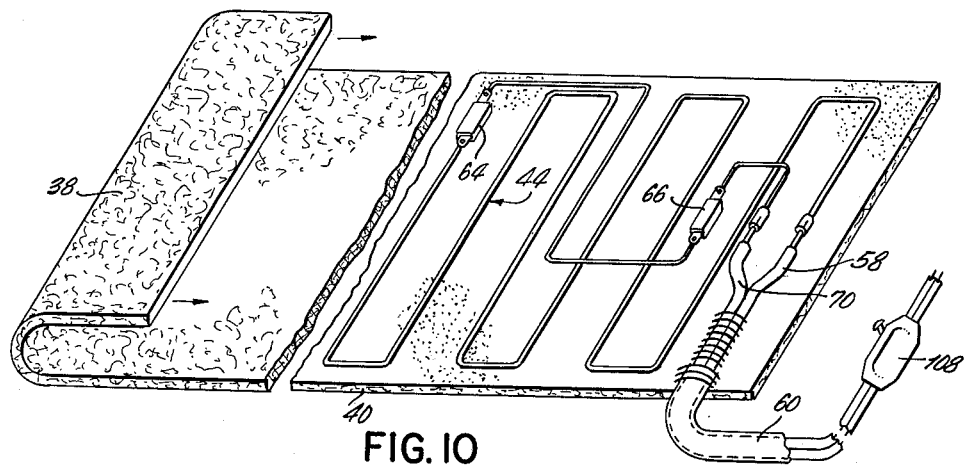
FIG. 10 is a perspective view illustrating a step in the process of producing an embodiment of the invention.

As can be seen in FIG. 10, the layers of jute 38 and 40 can be obtained from a single sheet of material which is folded over to form one edge of the warming pillow.

Figure 9:
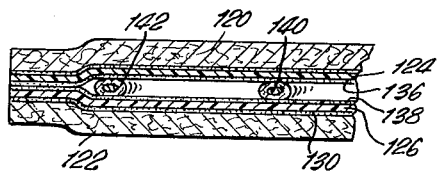
FIG. 9 is a sectional view illustrating how the components of FIG. 8 are assembled.

Referring now to the embodiment of the invention shown in FIGS. 8 and 9 it will be noted that sandwiched between the layers of jute 120 and 122 are sheets of fiber board 124 and 126 such as vulcanized fibre which is an electrically insulative material. Layers of adhesive 128 and 130 are applied on the sized faces 132 and 134 of the jute layers 120 and 122. Further coatings 136 and 138 of adhesive are applied on the sheets of fiber board 124 and 126. The peripheral edges of the sheets 124 and 126 are bonded together while the adhesive coatings 136 and 138 firmly and securely hold the heating coil 140 in position with the adhesive firmly bonding to the asbestos covering 142 of the heating coil 140.

Figure 11:
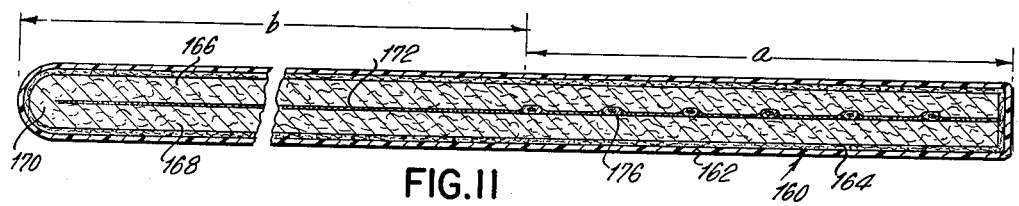
FIG. 11 is a vertical sectional view of another embodiment of the invention especially adapted for use in whelping and caring for newborn puppies.

In order to provide controlled heat to increase the chance of survival of puppies, it is within the concept of the invention to provide a whelping pad as shown in FIG. 11. The whelping pad employs the construction shown generally in FIGS. 1 through 7 and 10 and may employ vulcanized fibre sheets as desired.

The whelping pad 160 includes a removable slip-over type flannel outer cover 162, a fixed sewed-on inner cover 164 of rubber film on cotton backing. Two layers 166 and 168 of jute are provided which are formed from a single sheet folded double at 170. The opposed faces of the layers 166 and 168 are sized for strength and toughness and a coating of latex cement or other suitable adhesive 172 is applied thereto which serves to bond the jute layers 166 and 168 together firmly holding the asbestos covered heating coil 176 in place. It is noted that the heating coil 176 extends over an area covering only approximately one half of the whelping pad 160 as indicated by the arrow $a$ while the other half of the whelping pad is unheated in a section indicated by the arrow $b$. If it is desired, fiber sheets such as sheets of vulcanized fiber can be inserted in a manner shown in FIGS. 8 and 9 or in the manner illustrated in FIGS. 18 through 21 to be hereinafter described. When sheets of vulcanized fiber are used, portion $a$ is not bendable while the portion $b$ may be folded to overlie the portion $a$ or to underlie the portion $a$ as may be desired.

Figure 12:
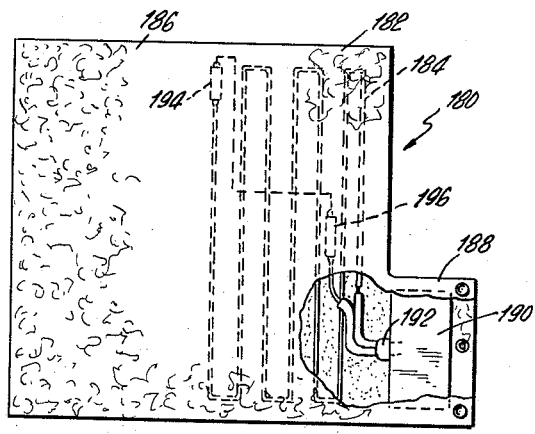
FIG. 12 is a plan view of an embodiment of whelping pad which contains its own power supply.

Referring now to the embodiment of the invention shown in FIG. 12 and designated by reference numeral 180, there is disclosed a whelping pad having a portion 182 provided with a heating coil 184 embedded therein and a portion 186 which is unheated. Adjacent the portion 182 and at one corner thereof is a casing portion 188 for containing a power pack 190 of conventional construction which is removable and replaceably inserted in the casing 188 for connection to a plug-in type connector 192 electrically attached to the heating coil 184. The heating coil 184 is protected by suitable thermostats 194 and 196 and may be of the construction shown in FIGS. 8 or 10 as may be desired. The whelping pad 180 is especially adapted for use in whelping litters of dogs or like animals in barns or other places where electrical outlets are not provided or easily accessible so that the whelping pad provides its own source of electrical power.

Referring now to the embodiment of the invention as shown in FIGS. 13 through 16, there is disclosed a warming pad for animals generally designated by reference numeral 200 which includes layers 202 and 204 of jute between which a tape 206 is embedded, the tape serving as the heating element of this warming pad. This type of heating element is provided with suitable thermostats 208 and 210 connected to the strip 206. Of course, suitable inner and outer covers may be provided for this form of the invention as was previously described for the embodiment shown in FIGS. 1 through 7.

The strip 206 includes a plurality of conductors 212, 214, and 216 which are trunked together to form one side of an electrical distribution system and a second set of conductors 218, 220, and 222 are insulated from the conductors 212, 214, and 216. The strip may be formed of a suitable plastic material in which the conductors are embedded and suitable plastic covers 224 and 226 are provided to completely enclose the tape after which the tape is secured by means of adhesive strip layers 230 to the layers of jute 202 and 204. The conductors 234 and 236 of the cord 238 are connected to the tape 206 by means of eyelets such as are indicated at 240, 242 and eyelets 244 and 246 are provided for connecting the conductors 248, and 250 to the tape 206 which conductors are connected to the thermostats 208 and 210 interconnected by conductor 252.

In FIGS. 18 to 21 there is disclosed another and preferred embodiment of the invention generally indicated by reference numeral 300 including upper and lower layers of jute 302, 304 respectively. The jute layers 302, 304 are sized on opposing faces as at 306 and 308. Adhesive coatings 310 and 312 are applied on the jute layers 302 and 304. A heating assembly 314 including upper and lower sheets 316 and 318 of vulcanized fiber within which a heating coil 320 is adhesively fixed is positioned between the jute layers 302, 304 and bonded thereto by adhesive coatings 310, 312. The vulcanized fiber sheets have adhesive coatings 322 and 324 on the opposed faces thereof which bond securely with the asbestos covering 326 about the heating coil 320. The heating coil is in the form as heretofore described with respect to FIG. 10 covering about one-half the area of the pad, and thermostats 330 and 332 may be employed. The ends of the heating coil are connected to conductors 334 and 336 of a cord 338 which as shown in FIG. 21 may be stapled in position between the sheets of fiber board and which comes out of the corner opening 342. The edges of the fiber board are stapled together by a conventional stapling process using staples 344, as can best be seen in FIGS. 20 and 21. In order to substantially waterproof the warming pad, a waterproof tape having an adhesive on one side thereof is secured along the edges of the fiber board 316 and 318. The tape is generally indicated at 350.

It is to be noted that in the form of the invention as shown in FIGS. 18 through 21, the layers of jute 302, and 304 provide a relatively soft pillow while the vulcanized fiber not only electrically insulates the warming pillow but renders the heating coil substantially bite-proof. The tape 350 in conjunction with the vulcanized fibre substantially water-proofs the heating coil, it being noted that the corner opening 304 may be shielded in any conventional manner by adhesive waterproof tape or the like as desired.

As shown in FIG. 18, alternatively a casing portion 388 containing a power pack 390 removably insertable in the casing 388 may be provided. The conductors 334 and 336 are connected to a plug-in type connection 392 for connection to the power pack 390.

An inner cover 376 of rubber sheeting similar to cover 36 is provided as is a removable slipover cover of flannel 378.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What we claim is:

1. A whelping pad for animals comprising a substantially rectangular shaped pillow, said pillow having opposed relatively thick layers of jute padding, a pair of vulcanized sheets between said layers of jute padding and extending along only one half of said layers of jute padding and being bonded to said layers of jute padding, a heating coil between said vulcanized sheets, means securing the peripheral edges of said vulcanized sheets together, a waterproof tape secured over said peripheral edges of said vulcanized sheets, a waterproof envelope embracing and completely enclosing said layers of jute padding, and a flannel slip-over cover removably covering said waterproof envelope.

2. A whelping pad according to claim 1, including a casing secured to said envelope, and a power pack removably secured in said casing and detachably electrically connected to said heating coil.

3. A whelping pad for animals according to claim 1, wherein said heating coil and said vulcanized fiber sheets extend along only one-half of said layers of jute padding.

References Cited in the file of this patent

UNITED STATES PATENTS

| | | |
|---|---|---|
| 2,114,396 | McFarlan et al. | Apr. 19, 1938 |
| 2,392,712 | Woodman | Jan. 8, 1946 |
| 2,423,196 | MacKendrick | July 1, 1947 |
| 2,467,349 | Van Daam | Apr. 12, 1949 |
| 2,481,050 | Starnes | Sept. 6, 1949 |
| 2,613,306 | Waltersdorf et al. | Oct. 7, 1952 |
| 2,715,674 | Abbott et al. | Aug. 16, 1955 |
| 2,737,571 | Eisler | Mar. 6, 1956 |
| 2,938,103 | Crump | May 24, 1960 |
| 2,948,802 | Shaw | Aug. 9, 1960 |
| 2,980,058 | Hoffman | Apr. 18, 1961 |
| 2,993,979 | Hornsby | July 25, 1961 |

FOREIGN PATENTS

| | | |
|---|---|---|
| 561,436 | Great Britain | May 19, 1944 |